July 14, 1959  E. R. McDONOUGH  2,894,756
MANURE SPREADER BODY STRUCTURE
Filed Sept. 4, 1956  7 Sheets-Sheet 1
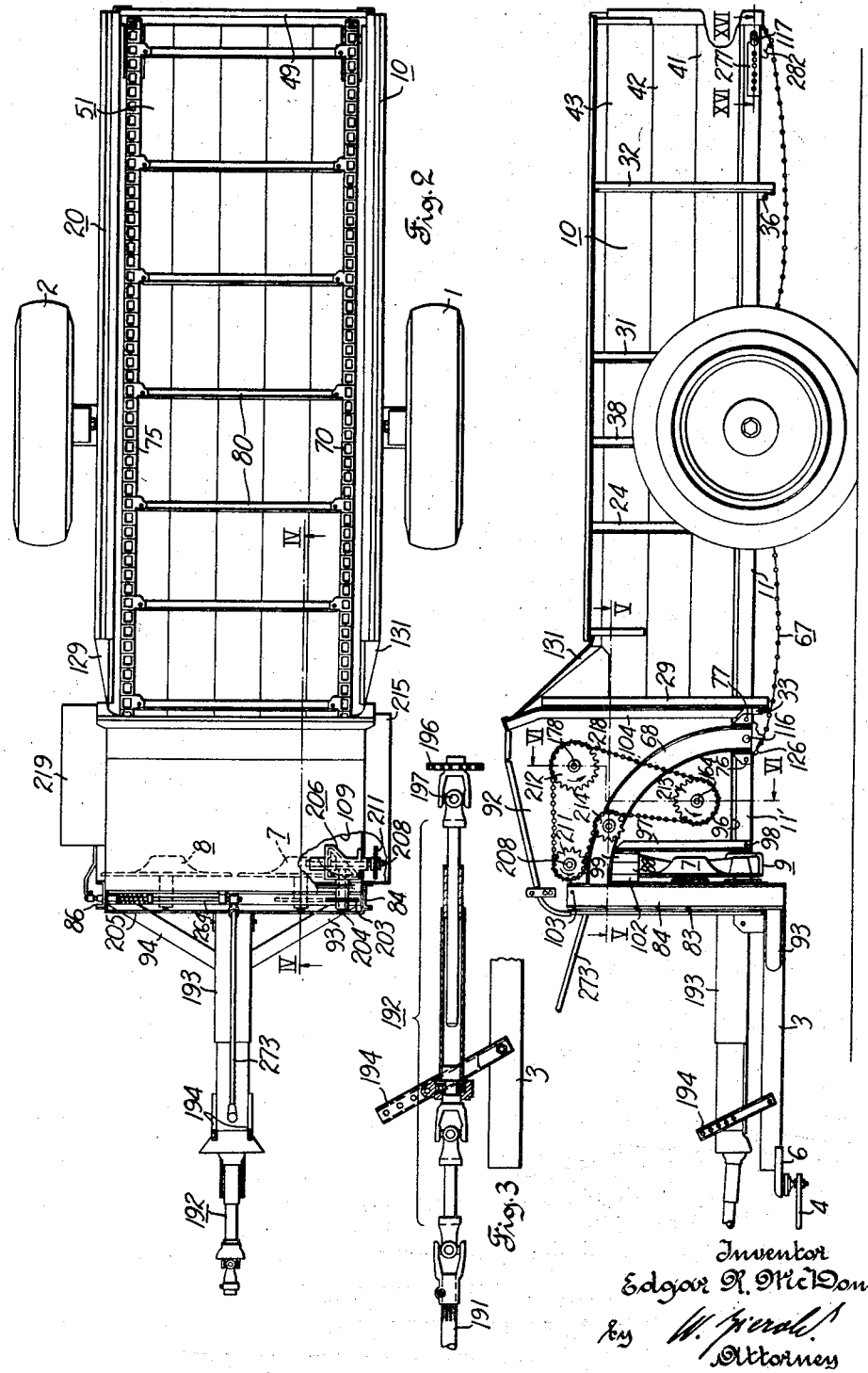

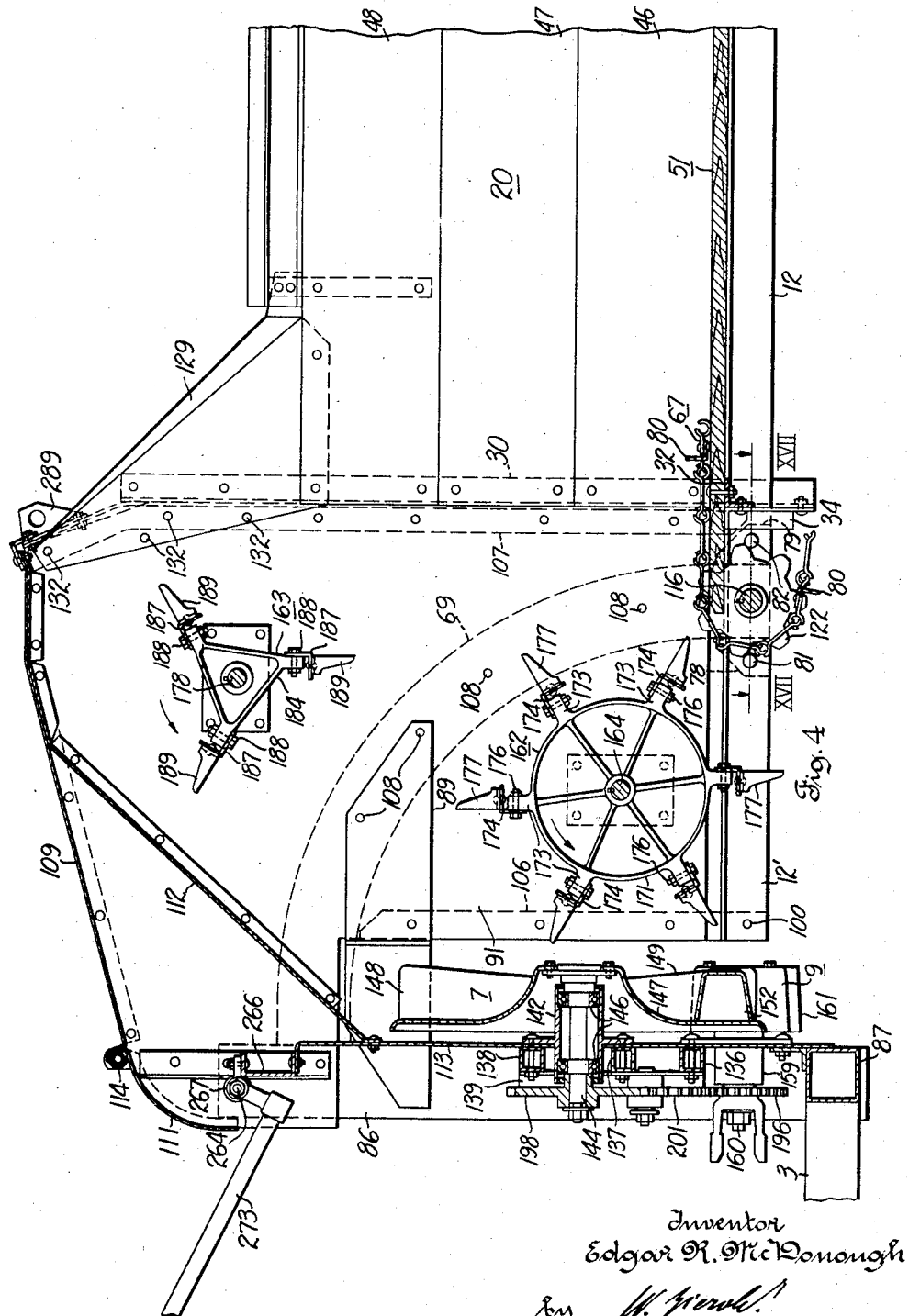

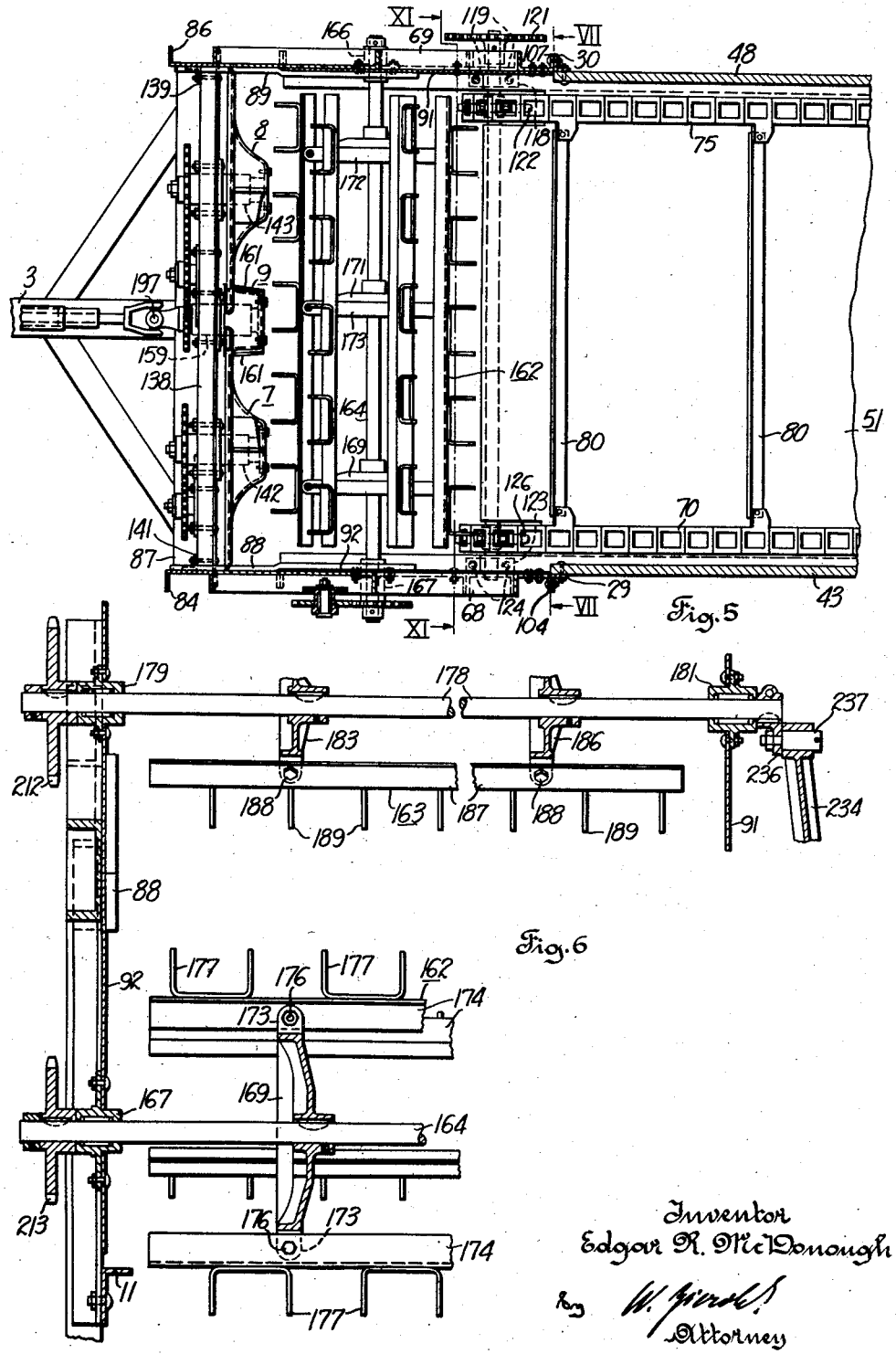

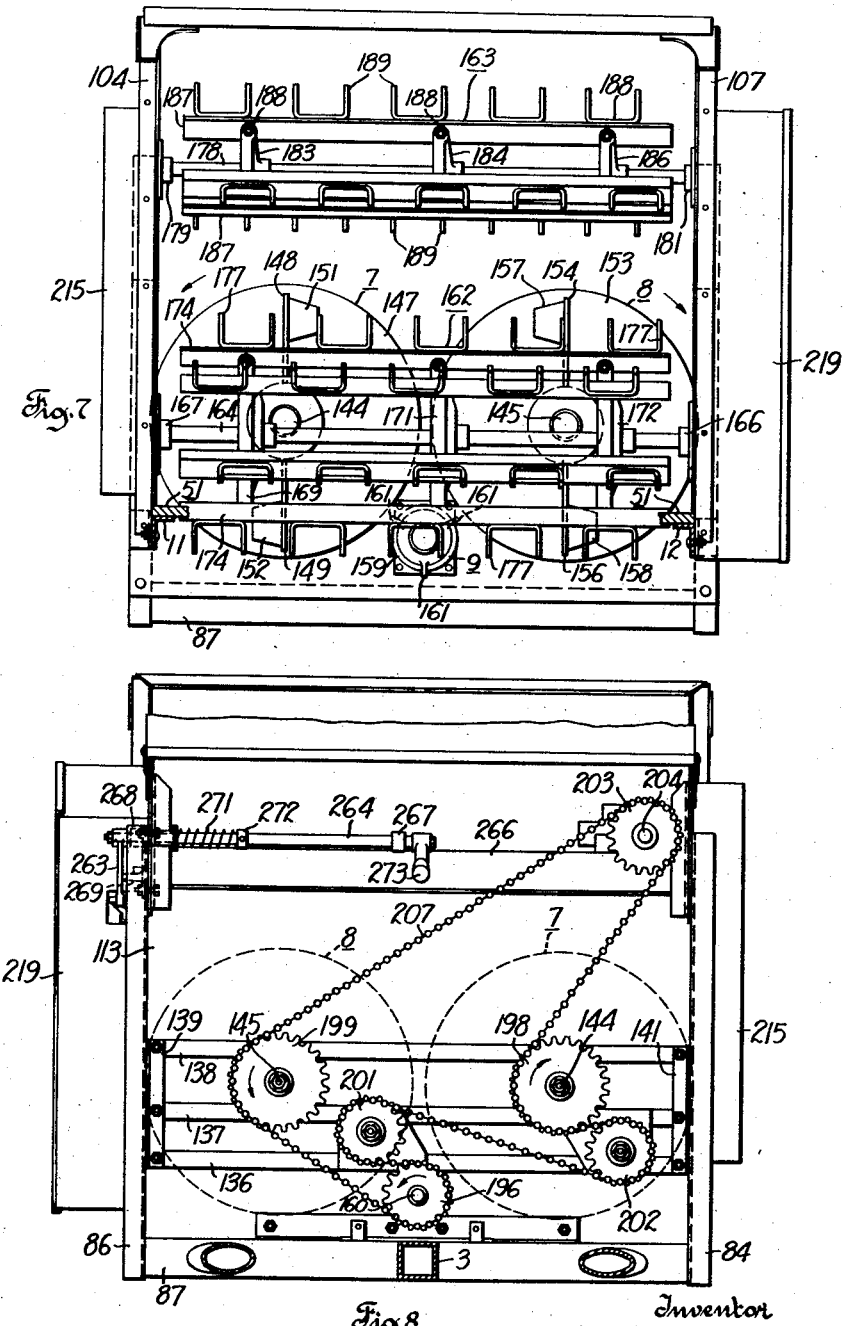

July 14, 1959

E. R. McDONOUGH 2,894,756

MANURE SPREADER BODY STRUCTURE

Filed Sept. 4, 1956

Inventor
Edgar R. McDonough
by W. Pierel
Attorney

July 14, 1959 E. R. McDONOUGH 2,894,756
MANURE SPREADER BODY STRUCTURE
Filed Sept. 4, 1956 7 Sheets-Sheet 6
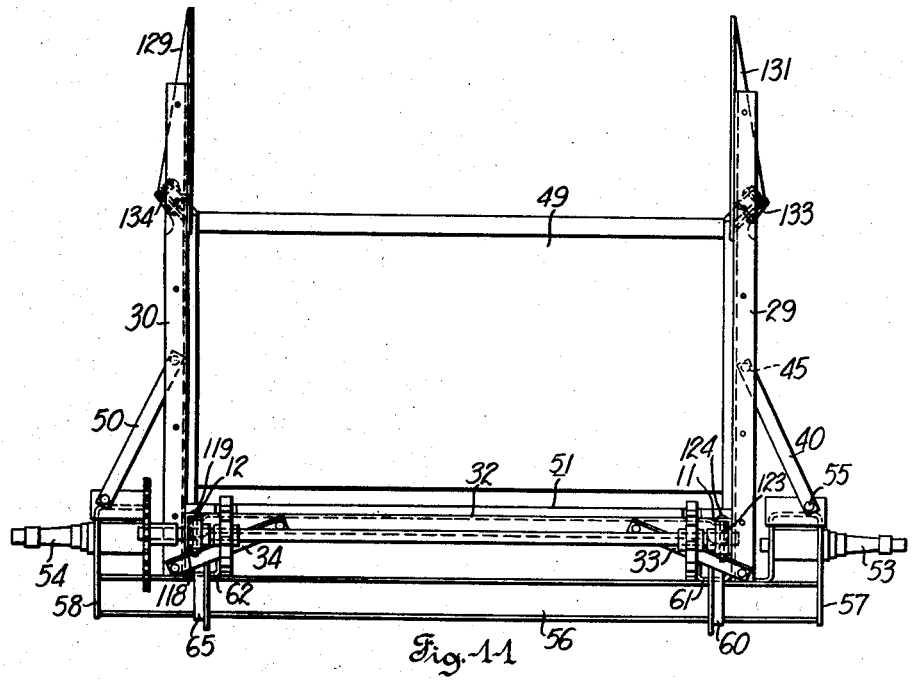
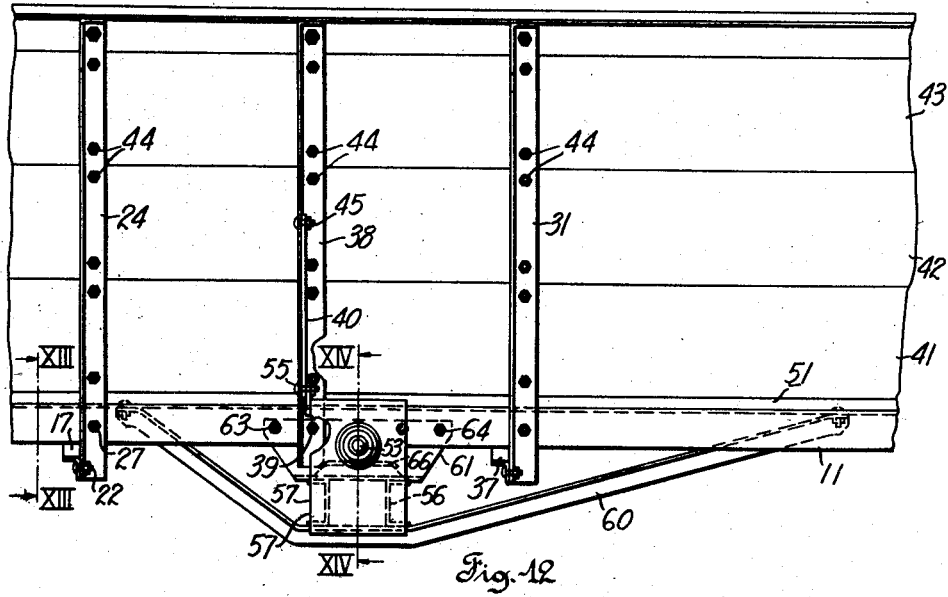
Inventor
Edgar R. McDonough
Attorney July 14, 1959

E. R. McDONOUGH 2,894,756

MANURE SPREADER BODY STRUCTURE

Filed Sept. 4, 1956

Inventor
Edgar R. McDonough

By W. Judd
Attorney

United States Patent Office 2,894,756
Patented July 14, 1959

2,894,756

MANURE SPREADER BODY STRUCTURE

Edgar R. McDonough, La Porte, Ind., assignor to Allis-Chalmers Manufacturing Company, Milwaukee, Wis.

Application September 4, 1956, Serial No. 607,816

6 Claims. (Cl. 275—6)

This invention relates to manure spreaders and similar apparatus which are used to haul a load of material from one place to another and to scatter the load, while in transit, over a wide ground area.

In spreading stable manure on farm land it is usually desirable to obtain a layer of uniformly and finely disintegrated material on an area of fairly defined limits. This result is not very well accomplished, however, by the rotary bladed wide spread which has been commonly used on manure spreaders for many years.

In order to do away with the conventional rotary wide spread and to obtain a better distribution of the manure on the ground, a side delivery type of manure spreader has heretofore been suggested wherein a load of manure is advanced within a wagon box by means of a horizontal floor conveyer and wherein a pair of feeding cones and a beater are provided to deliver the manure to a set of vertical slingers which are mounted opposite the delivery end of the conveyer. The slingers are driven to rotate on parallel horizontal axes, and the load carrying receptacle is provided with gaps in its bottom and side walls through which the manure is thrown downward and outward to the right and left by action of the slingers. A manure spreader of this vertical slinger type is disclosed, for instance, in U.S. Patent 2,660,439 issued on November 24, 1953 to C. J. Scranton for Manure Spreader.

The provision of a set of vertical, rotary slingers which, as stated, throw the manure right and left and under the load carrying receptacle of the spreader presents certain problems, particularly in the matter of feeding the manure to the slingers in proper form and in a suitable manner so that the slingers can handle the manure without undue consumption of power and so that the desired layer of uniformly and finely disintegrated material on the ground will be obtained.

Another problem presented by a manure spreader of the type disclosed in the mentioned Scranton patent is the matter of keeping the weight of the machine and its cost at a desirably low figure. It is necessary, as stated, to provide gaps in the bottom and side walls of the wagon box for the ejection of manure under and to both sides of the box, and it is also necessary to provide for considerable strength of the machine as a whole, so that it will stand up under the extremely heavy loads and rough usage to which it is subjected in operation. The need for the gaps and the requirement of adequate strength are somewhat conflicting and difficult to take care of without restorting to an excessively heavy and expensive construction.

In the manure spreader as disclosed in the mentioned Scranton patent the downward discharge of manure from the wagon box is partly obstructed by a central frame beam of relatively large cross section which is provided for strength purposes and which extends horizontally across the bottom gap in a rearward direction at the under side of the wagon box. In operation of said earlier spreader, manure which is impelled by the vertical slingers will settle on the mentioned frame beam and the ground below the beam will not be covered with manure to the same extent as other ground areas which are directly exposed to the manure particles which are ejected from the wagon box by the slingers.

Generally, it is an object of the present invention to provide an improved manure spreader of the type disclosed in the mentioned Scranton patent and which will take care of the hereinbefore outlined problems in a practical and entirely satisfactory manner.

More specifically, it is an object of the present invention to provide an improved material handling mechanism for a manure spreader of the vertical slinger type, which will be operable efficiently and require a minimum amount of driving power.

Another object of the invention is to provide an improved manure spreader of the hereinabove outlined character which is not only devoid of gap obstructing frame elements, such as the mentioned central frame beam, but which is also economical to build and yet sufficiently strong so that it can be subjected to rough usage without harm as when it is loaded with a tractor mounted loader or when it is pulled, fully loaded, by a tractor over humps and ditches at a relatively high speed such as six miles per hour.

These and other objects and advantages are attained by the present invention, various novel features of which will be apparent from the description herein and the accompanying drawings disclosing an embodiment of the invention, and will be more particularly pointed out in the appended claims.

In the drawings:

Fig. 1 is a side view of a manure spreader adapted for hitching to a tractor, part of a tractor drawbar being shown at the left end of the figure;

Fig. 2 is a top view of the manure spreader shown in Fig. 1, portions being broken away and others omitted;

Fig. 3 is a detail view, partly in section, of a drive shaft assembly at the forward end of the manure spreader shown in Figs. 1 and 2;

Fig. 4 is a partial, enlarged side view in section on line IV—IV of Fig. 2;

Fig. 5 is a partial, enlarged top view in section on line V—V of Fig. 1;

Fig. 6 is an enlarged sectional view on line VI—VI of Fig. 1 showing broken away parts at the right and left sides of the machine, the terms right and left as used herein conforming with the orientation of an operator standing in rear of and facing toward the machine;

Fig. 7 is an elevational view looking in the direction of arrows VII—VII in Fig. 5, parts of the machine as viewed in Fig. 7 being omitted and others being broken away and shown in section on line VII—VII in Fig. 5;

Fig. 8 is a front view of the machine shown in Figs. 1 and 2, a front cover shown in Figs. 1 and 2 being omitted and a draft tongue being partly broken away and shown in section;

Fig. 8 is a perspective veiew of a front frame and draft tongue assembly of the manure spreader shown in Figs. 1 and 2;

Fig. 11 is an elevational view looking in the direction of arrows XI—XI in Fig. 5, parts of the machine as viewed in Fig. 11 being omitted and others being broken away and shown in section on line XI—XI in Fig. 5;

Fig. 12 is an enlarged partial side view of the machine shown in Fig. 1, the supporting wheel at the left side of the machine being omitted to expose details of construction;

Figure 9:
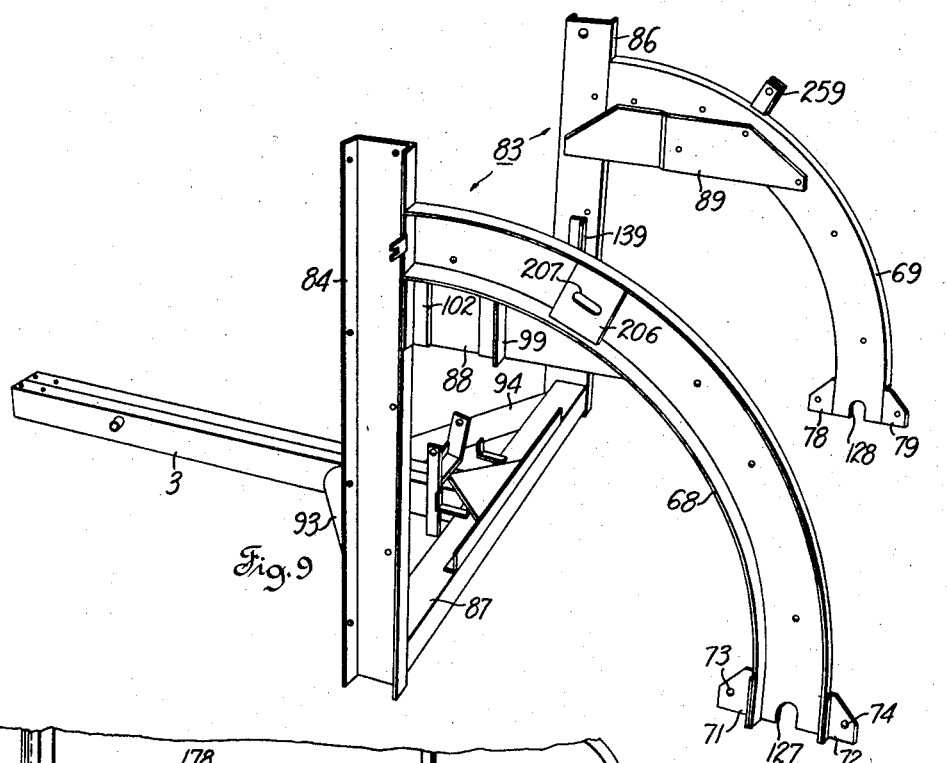

Referring to Figs. 1 and 2, the manure spreader shown is of the semitrailer type, that is, it has two supporting wheels 1 and 2, and a draft tongue 3 by means of which the unbalanced weight of the spreader may be sustained on a tractor or other draft vehicle. Part of a tractor drawbar is designated by the reference character 4 at the left and of Fig. 1, and a suitable coupling of conventional construction for connecting the forward end of the draft tongue 3 in load sustaining relation with the tractor drawbar 4 is generally indicated at 6. About midway between the front end of the draft tongue 3 and the axis of the supporting wheels 1 and 2 is the spreading zone where manure is discharged downwardly under the trailer body and also to the right and left by ejecting means comprising rotary slingers 7 and 8 shown in Figs. 1 and 2, and by a third rotary slinger 9 (Fig. 7) which is smaller than the slingers 7 and 8 and located midway between the right and left sides of the machine.

Figure 13:
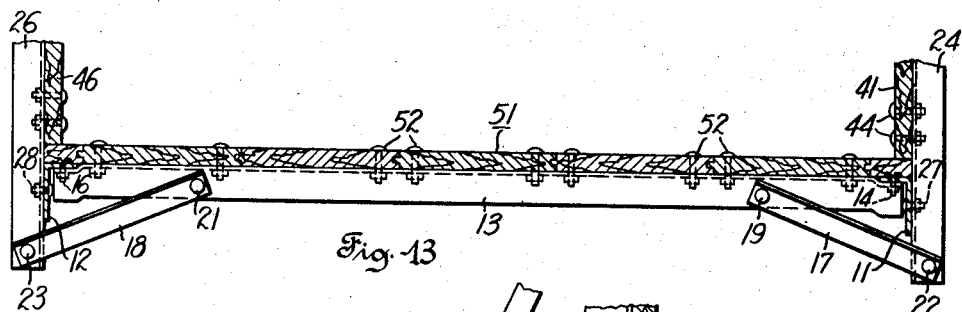
Fig. 13 is an enlarged section on line XIII—XIII of Fig. 12.

A bed frame of the machine comprises a pair of transversely spaced horizontal side beams, one of which is shown in its entire length at the left side of the machine in Fig. 1 and designated by the reference character 11. The other side beam 12 of the bed frame extends at the right side of the machine in parallel relation to the left side beam 11, and a substantial part of the right side beam 12 is best shown in Fig. 4. The side beams 11 and 12 are made of angle iron and, as shown in Fig. 13, are so arranged that each presents a vertical outer flange and a horizontal, inwardly extending upper flange. The side beams 11 and 12 of the bed frame are connected together by a suitable number of cross members, one of which is shown in Fig. 13 and designated by the reference character 13. Opposite ends of the cross member 13 are secured to the top flanges of the side beams 11 and 12 by bolts 14 and 16, respectively.

The cross member 13 shown in Fig. 13 has a downwardly extending flange to which diagonal braces 17 and 18 are secured at their inner ends as shown at 19 and 21. The outer ends of the diagonal braces 17 and 18 are detachably secured by bolts 22, 23 and associated nuts to the lower ends of vertical angle iron posts 24 and 26, these posts and the brace 13 being arranged in a common vertical plane extending transversely of the machine. The left post 24 is detachably secured to the vertical flange of the adjacent side beam 11 of the bed frame by a bolt 27 and associated nut; and the right post 26 is similarly secured by a bolt 28 and associated nut to the vertical flange of the adjacent side beam 12.

Referring to Fig. 1, a vertical angle iron post 29 is shown at a forward distance from the angle iron post 24, and additional angle iron posts 31 and 32 are shown at progressively greater rearward distances from the post 24. Each of the posts 29, 31 and 32 at the left side of the machine is paired with a corresponding post at the right side of the machine, and the explanations hereinbefore with reference to the paired posts 24 and 26 shown in Fig. 13, similarly apply to the mounting of the posts 29, 31 and 32 and their mates at the other side of the machine. As shown in Fig. 11, the post 29 at the left side of the machine has a mate 30 at the right side of the machine, and a cross member 32 corresponding to the cross member 13 extends in the same transverse vertical plane as the posts 29 and 30. Diagonal braces 33 and 34 in Fig. 11 correspond to the diagonal braces 17 and 18 in Fig. 13.

In Fig. 1, the diagonal brace which connects the lower end of the vertical post 32 with the associated cross member (not shown) of the bed frame is shown at 36; and in Fig. 12 the diagonal brace which connects the lower end of the vertical post 31 with the associated cross member (not shown) of the bed frame is shown at 37. Fig. 12 also shows a vertical post 38 midway between the posts 24 and 31, the lower end of the post 38 being detachably secured to the vertical flange of the side beam 11 by means of a bolt 39 and associated nut. Another post, not shown, corresponding to the post 38 is mounted at the right side of the machine.

All of the posts 24, 29, 31, 32 and 38 are connected together by three wooden boards 41, 42 and 43 placed on edge next to each other so as to form a vertical wall at the left side of the machine. Some of the bolts by means of which the boards 41, 42 and 43 are secured to the vertical posts at the left side of the machine are indicated by the reference character 44 in Figs. 12 and 13. At the right side of the machine a side wall is formed by three wooden boards 46, 47 and 48 (Fig. 4) which are placed on edge next to each other and connected together by a series of vertical posts at the right side of the machine including the post 26 (Fig. 13) and 30 (Figs. 4 and 5). A rear transverse wall 49 (Fig. 2) is detachably connected by suitable means, not shown, to the rear ends of the boards 41, 42, 43 at the left side of the machine and to the rear ends of the boards 46, 47, 48 at the right side of the machine.

Extending lengthwise of the bed frame and supported on top of its cross members is a wooden floor 51 which is made up of a number of matched boards as best shown in Fig. 13. Some of the bolts which secure the floor 51 to the bed frame are indicated at 52 in Fig. 13.

Figure 14:
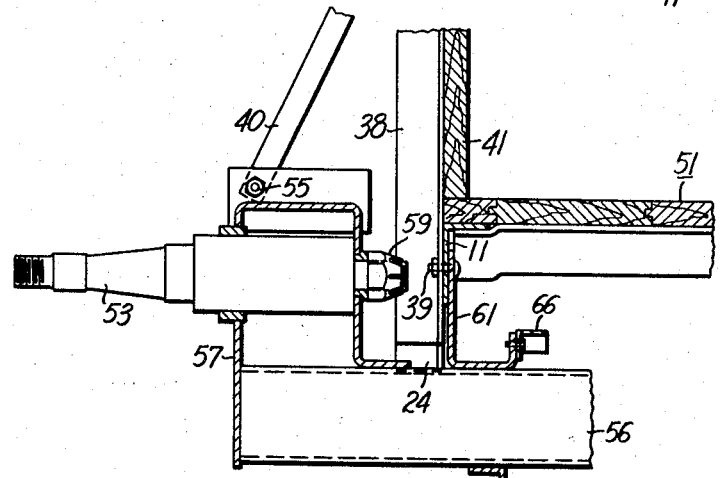
Fig. 14 is an enlarged partial section on line XIV—XIV of Fig. 12.

The supporting wheels 1 and 2 of the spreader are rotatably mounted on spindles 53 and 54 (Fig. 11) of a drop axle structure comprising a transverse beam assembly 56, and end brackets 57, 58 projecting upwardly from the beam assembly 56 at opposite sides, respectively, of the machine. As best shown in Fig. 14, the wheel spindle 53 is supported in aligned bores of the end bracket 57 and retained in axially fixed position by means of a nut 59. The wheel spindle 54 is similarly mounted in the end bracket 58 at the right side of the machine. As shown in Fig. 14, the drop axle structure 56, 57 and 58 is secured to the vertical flange of the side beam 11 by means of an L-shaped bracket 61, which is mounted on the beam assembly 56 at a short inward distance from the spindle bracket 57; and a similar L-shaped bracket 62 (Fig. 11) is mounted on the beam assembly 56 at a short inward distance from the spindle bracket 58 for connecting the axle structure to the vertical flange of the side beam 12. As shown in Figs. 12 and 14, the bracket 61 has a vertical leg which overlaps the depending flange of the side beam 11 and is secured thereto by bolts 63 and 64 and associated nuts. A guide pad 66 for the lower run of a slat conveyer 67 shown in Fig. 1 and to be described later, is secured to an upstanding lip of the bracket 61 as shown in Fig. 14. The same explanations similarly apply to the L-shaped bracket 62 (Fig. 11) which is secured to the side beam 12 at the right side of the machine. A bowed truss 60 (Fig. 12) cradles the beam assembly 56 in underlying relation to the bracket 61 and is secured at its front and rear ends to the horizontal flange of the side beam 11. A similar truss 65 (Fig. 11) cradles the beam assembly 56 in underlying relation to the bracket 62 and is secured to the horizontal flange of the side beam 12.

As shown in Figs. 11 and 12, a downwardly and outwardly extending stiffening bar 40 is secured at its upper end to the angle iron post 38 by a bolt 45 and associated nut, and the lower end of the stiffening bar 40 is detachably secured to the spindle bracket 57 by a bolt 55 and associated nut. Another stiffening bar 50, corresponding to the stiffening bar 40, is similarly mounted at the right side of the machine and detachably connected to the spindle bracket 58.

A pair of curved, transversely spaced tie beams 68 (Fig. 1) and 69 (Fig. 4) are connected in upwardly and forwardly projecting relation to the side beams 11 and 12, respectively, of the bed frame. As best shown in the perspective view of Fig. 9, the tie beam 68 is made of channel iron and bent into arcuate shape so that its rearward lower end will extend in substantially right angle relation to the side beam 11 of the bed frame, and so that its forward upper end will project above and beyond the forward end of the bed frame in a generally horizontal direction. A pair of angle clips 71 and 72 are welded to the lower end of the tie beam 68 to provide front and rear fastening lugs for connection with the vertical flange of the side beam 11. The angle clip 71 has a hole 73 which in the assembled condition of the machine as shown in Fig. 1 registers with a hole in the vertical flange of the side beam 11 and the angle clip 72 has a hole 74 which similarly registers with another hole in the vertical flange of the side beam 11. Bolts 76 and 77 (Fig. 1) are passed through the holes 73 and 74 and through the registering holes in the side beam 11, and nuts (not shown) on the bolts 76 and 77 are drawn up to rigidly secure the tie beam 68 in fixed position on the side beam 11.

The foregoing explanations with respect to the tie beam 68 similarly apply to the tie beam 69. That is, a pair of angle clips 78 and 79 (Fig. 9) are secured to the rearward lower end of the tie beam 69 and a pair of bolts 81 and 82 (Fig. 4) are passed through holes in the angle clips 78 and 79 and through registering holes in the vertical flange of the side beam 12, and nuts (not shown) on the bolts 81 and 82 are drawn up to rigidly secure the tie beam 69 to the side beam 12 in the fixed position in which it is shown in Fig. 4. It will be noted that in the assembled condition of the machine as shown in Figs. 1 and 4, forward end portions 11' and 12' of the side beams 11 and 12 project horizontally forward beyond the rear lower ends of the arcuate tie beams 68 and 69, respectively.

A transverse frame structure generally designated by the reference character 83 in Fig. 1 is rigidly connected with and depends from the forward ends of the tie beams 68 and 69 in forwardly spaced relation to the forward ends of the side beams 11 and 12 so as to leave an unobstructed manure discharge space at the bottom and opposite sides of the transverse frame structure 83 in rear of the latter and forwardly of the bed frame afforded by the side beams 11, 12 and associated cross members. As best shown in Fig. 9, the transverse frame structure 83 comprises a pair of vertical channel iron posts 84, 86 and a transverse horizontal tubular beam 87 which is rigidly connected at its opposite ends, as by welding, to the lower ends of the vertical posts 84 and 86. Fig. 9 also shows the upper ends of the tie beams 68 and 69 in abutting engagement with the vertical rear flanges of the posts 84 and 86, respectively. The tie beams 68 and 69 and the posts 84 and 86 are rigidly secured together in the relative positions in which they are shown in Fig. 9, preferably by welding, and reinforcing plates 88 and 89 are secured to the inner sides of the posts 84 and 86, respectively, and overlap the inner sides of the tie beams 68 and 69, respectively. The forward part of the plate 89 is rigidly secured, as by welding, not only to the post 86, but also to the adjacent part of the tie beam 69. A rearward part of the plate 89 is offset inwardly from the tie beam 69 so as to leave a gap between the rearward part of the plate 89 and the adjacent portion of the tie beam 69. The purpose of this gap is to admit a side sheet 91 (Fig. 5) which in the assembled condition of the machine as shown in Fig. 4 extends between the side wall post 30 and the upper part of the channel iron post 86 at the right side of the machine.

The foregoing explanations regarding the reinforcing plate 89 similarly apply to the reinforcing plate 88 which is shown in Fig. 9, and a rearward portion of which is inwardly offset from the tie beam 68. A side sheet 92 (Figs. 5 and 15) corresponding to the side sheet 91 is sandwiched between tie beam 68 and the inwardly offset rear portion of the reinforcing plate 88.

A hitch structure including the draft tongue 3 and a pair of diverging tubular braces 93 and 94 (Figs. 2 and 9) is secured to the transverse frame structure 83 independently of the bed frame 11, 12 and in nonobstructing relation to the mentioned manure discharge space between the frame structure 83 and the forward end of the bed frame. The rear end of the draft tongue 3 terminates in front of the cross member 87 and is rigidly connected therewith as by welding. Similarly, the diagonal braces 93 and 94 terminate at the forward side of the cross member 87 in proximity to the posts 84 and 86, respectively, and are secured in place, as by welding, at the forward side of the cross member 87.

Figure 15:
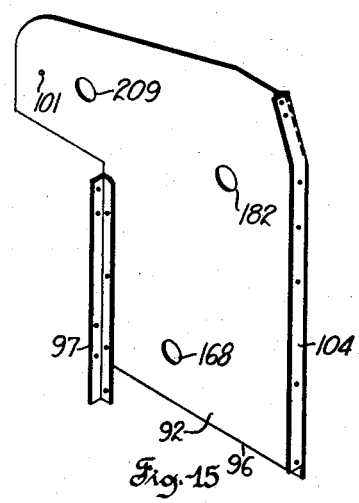
Fig. 15 is a perspective view of a side sheet at the left side of the machine shown in Figs. 1 and 2.

The side sheets 91 and 92 which have been mentioned hereinbefore in connection with Figs. 5 and 15 form part of a hood structure at the forward end of the machine, and the slat conveyor 67 whose lower run is indicated in Fig. 1 serves to advance manure from the space between the opposite side walls and the rear wall 49 of the wagon box toward the forward hood structure. The side sheet 92 which forms the left side wall of the forward hood structure and which is shown separately in Fig. 15, has a bottom edge 96 which in the mounted condition of the side sheet 92 as shown in Fig. 1, extends along the forward end portion 11' of the side beam 11 at the upper side of the latter. An angle iron 97 which, as shown in Fig. 1, extends straight upward from the side beam 11 is rigidly secured to the side sheet 92 along an upwardly extending edge portion of the latter as best shown in Fig. 15. The angle iron 97 is secured at its lower end to the side beam 11 by means of a bolt 98 and associated nut, and the upper end of the angle iron 97 terminates opposite the under side of the curved tie beam 68. As shown in Fig. 9, a short piece of angle iron 99 is secured, as by welding, to the outer face of the reinforcing plate 88 and the upper end of the angle iron 97 is suitably secured to the angle iron 99 as by a pair of bolts, not shown. As shown in Fig. 9, another angle iron 102 is secured to the rear flange of the post 84 and to the outer face of the reinforcing plate 88, as by welding, for reinforcing purposes.

The upper part of the side sheet 92 (Fig. 15) is extended forwardly beyond the angle iron 97. The upper end of the channel post 84 (Fig. 1) overlaps a portion of the forwardly extending part of the side sheet 92, and a bolt 103 extends through the web of the channel 84 and through a registering hole 101 (Fig. 15) in the side sheet 92 for securing the side sheet to the upper end of the channel 84. Additional bolts, not shown, extend through the web of the tie beam 68 and through registering holes in the side sheet 92 for securing the side sheet 92 to the tie beam 68, some of these holes also extending through the rearward portion of the reinforcing plate 88 which, as explained hereinbefore, overlaps the side sheet 92 at its inner side.

The side sheet 92 (Figs. 1 and 15) also mounts an angle iron bar 104 which presents an attaching flange for detachably connecting the side sheet 92 to the vertical post 29 at the left side of the machine. One flange of the angle iron bar 104 is connected to the outer side of the side sheet 92 in any suitable manner, as by a series of bolts, and the other flange of the bar 104 abuts the outwardly extending flange of the post 29 and is connected thereto by a series of bolts, not shown. The lower end of the angle iron bar 104 overlaps the side beam 11 and terminates a short distance above the angle clip 72 of the arcuate tie beam 68. The upper part of the angle iron bar 104 extends upwardly beyond the upper end of the angle iron post 29 and is slightly angled in a forward direction as shown in Fig. 1.

The foregoing explanations with respect to the shape and mounting of the side sheet 92, similarly apply to the side sheet 91 which forms the left side wall of the forward hood structure. As best shown in Fig. 4, the left side sheet 91 mounts a front angle iron 106 at its outer side, corresponding to the angle iron 97 of the side sheet 92, and an angle iron bar 107 corresponding to the angle iron bar 104 of the side sheet 92. The side sheet 91 is secured to the inner side of the tie beam 69 by a series of bolts 108, some of which also extend through the rearward portion of the side plate 89 as shown in Fig. 4.

The space between the side sheets 91 and 92 is closed at the top by a sheet metal top wall 109 and by a hinged cover 111 as best shown in Fig. 4. Also mounted in the space between side walls 91 and 92 is an oblique cross wall 112 which extends forwardly and downwardly from an intermediate part of the top wall 109 and terminates at its forward lower end on a vertical, transversely extending sheet metal wall 113. The triangular space below the forward part of the top wall 109 and above the oblique, transverse wall 112, may be used as a storage space for tools or the like. The cover 111 is connected to the forward end of the top wall 109 by means of a hinge 114 and may be swung upwardly from the closed position in which it is shown in Fig. 4, in order to afford access to the storage space between the walls 109 and 112.

The slat conveyor 67 which, as stated, is provided to advance material toward the forward end of the spreader is of conventional construction and comprises a pair of flat link chains 70, 75 and a series of angle iron slats 80. A front cross shaft 116 for operating the conveyer extends transversely between the side beams 11 and 12 at the lower ends of the arcuate tie beams 68 and 69, and a rear cross shaft 117 (Figs. 1 and 16) for the conveyer is mounted between the rear ends of the side beams 11 and 12. As indicated in Figs. 5 and 11, a bearing block 118 for supporting the conveyer drive shaft 116 is mounted on the inner side of the side beam 12 by means of two vertical retaining bolts 119 and associated nuts. As shown in Fig. 17, the right end of the conveyer drive shaft 116 extends outwardly through the vertical flange of the side beam 12 and through the web of the tie beam 69, and a drive sprocket 121 is keyed to the outer end of the shaft 116 and retained thereon in axially fixed position. Also keyed to the shaft 116 at the axially inner side of the bearing block 118 is a drive sprocket 122 for the chain 75 of the slat conveyor 67.

As shown in Figs. 5 and 11, a bearing block 123 for the conveyer drive shaft 116 is secured to the inner side of the side beam 11 by means of a pair of vertical bolts 124, and a drive sprocket 126 for the chain 70 of the slat conveyor 67 is secured to the conveyer drive shaft 116 at the axially inner side of the bearing block 123. The shaft 116 extends outwardly through the vertical flange of the side beam 11 and through the web of the arcuate tie beam 68 at the lower end of the latter. As shown in Fig. 9, the web of the tie beam 68 has an upwardly extending notch 127 at its lower end for the reception of the left end of the conveyer drive shaft 116, and the web of the arcuate tie beam 69 has a similar notch 128 for the reception of the portion of shaft 116 which extends outwardly from the side beam 12. The notches 127 and 128 afford the advantage that the entire bed frame, including the shaft 116, may be dropped away from the forward portion of the machine, including the tie beams 68 and 69, after the bolts which secure the tie beams 68, 69 and the vertical posts 97, 106 to the side beams 11 and 12 have been removed, and after the angle iron bars 104 and 107 have been disconnected from their associated vertical posts 29 and 31.

As shown in Fig. 4, an extension 129, preferably in the form of a sheet metal stamping, is bolted to the upper board 48 of the right side wall and extends upwardly and forwardly beyond the vertical post 30 at the right side of the machine. A similar extension 131 is secured to the forward end of the top board 43 at the left side of the machine and extends forwardly and upwardly beyond the vertical post 29. The extension 129, as shown in Fig. 4, overlaps the side sheet 91 at the inner side of the latter, and bolts 132 are suitably installed to detachably secure the forward end of the extension 129 to the side sheet 91. The forward end of the extension 131 at the left side of the machine is similarly secured by means of bolts to the side sheet 92.

The left side wall, including boards 41, 42, 43; the right side wall including boards 46, 47, 48; the rear wall 49 and the bottom wall or floor 51 form a receptacle or wagon box, and the sides of this box are flared outwardly at their upper ends as indicated at 133 and 134 in Fig. 11. The extensions 129 and 131 have flange portions of suitable configuration to extend between the flared upper portions 133 and 134 and the upper ends of the angle iron bars 104 and 107, respectively.

The vertical slingers 7, 8 and 9 which, as stated hereinbefore, are provided for throwing manure downward and outward in opposite directions are rotatably mounted on the front frame structure 83 which includes the vertical posts 84 and 86 and the transverse cross member 87. As shown in Figs. 4 and 8, tubular cross members 136, 137 and 138 are mounted between the vertical posts 84 and 86, by means of an angle iron bracket 139 (Fig. 9) which is secured to the inner side of the channel post 86 for supporting the cross members 136, 137, 138 on the post 86, and by means of a similar angle iron bracket 141 (Fig. 8) which is secured to the inner side of the channel iron post 84 for supporting the cross members 136, 137 and 138 on the channel iron post 84. A bearing support 142 (Fig. 4) for the slinger 7 is mounted on the cross members 137 and 138, the bearing support 142 being located at the left side of the vertical longitudinal center plane of the spreader. As shown in Fig. 5, another bearing support 143 similar to the bearing support 142 is mounted at the right side of the vertical longitudinal center plane of the spreader for mounting the slinger 8, the bearing support 143 being mounted on the cross members 137 and 138 in the same manner as the bearing support 142 shown in Fig. 4. The slinger 7, as shown in Fig. 4, comprises a shaft 144 which is mounted by means of antifriction bearings 146 within the bearing support 142 for rotation on a horizontal axis in right angle relation to the transverse frame structure 83. A dished disk 147 is secured to a hub of the shaft 144 at the inner end of the latter and presents a radial skirt in a vertical plane. A pair of diametrically opposed impeller blades 148 and 149 (Fig. 7) are secured to the skirt portion of the dished disk 147 in right angle relation thereto. The impeller blades 148 and 149 are reinforced at their trailing sides by hollow braces 151 and 152, the brace 152 being shown in section in Fig. 4.

The foregoing explanations with respect to the construction and mounting of the slinger 7, similarly apply to the slinger 8 which, as shown in Fig. 7, comprises a shaft 145, a dished disk 153, a pair of diametrically opposed impeller blades 154 and 156 and hollow braces 157 and 158.

The central slinger 9, as shown in Figs. 4, 5 and 7, is mounted in a bearing support 159 which is mounted on the lower cross member 87 and the transverse member 136 of the front frame structure. The slinger 9 has a shaft 160 (Fig. 4) which is mounted in the bearing support 159 for rotation on a horizontal axis by means of a pair of antifriction bearings, not shown, corresponding to the antifriction bearings 146 which support the slinger shaft 144. The slinger 9, comprises a slightly conical, central body portion and three radial impeller blades 161 equally spaced circumferentially about the central body portion. As shown in Figs. 5, 7 and 8, the slingers 7 and 8 are arranged side by side in a common vertical plane, and the slinger 9 is offset downwardly with respect to the slingers 7 and 8, but disposed generally in the same vertical plane as the slingers 7 and 8.

Shredding cylinder means comprising a lower shredding cylinder 162 (Fig. 4) and an upper shredding cylinder 163 in proximity to the walls 109 and 112 are operatively mounted within the laterally closed space in rear of the transverse frame structure 83. The shredding cylinders 162 and 163 are adapted upon rotation in a predetermined direction which is indicated by arrows in Fig. 4, to feed manure toward the transverse frame structure 83. Referring to Figs. 5, 6 and 7, the cylinder 162 comprises a transverse shaft 164 which is rotatably mounted in bearings 166 and 167 at the opposite sides, respectively, of the spreader. As shown in Fig. 6, the bearing 167 is mounted in an aperture 168 (Fig. 15) of the side sheet 92, and the bearing 166 is similarly mounted in an aperture of the side sheet 91. The bearings 166 and 167 are horizontally aligned so as to position the axis of the shaft 164 in a vertical transverse plane, rearwardly of the slingers 7 and 8 and in right angle relation to the axes of the slinger shafts 144, 145 and 160. Mounted on the shaft 164 of the lower shredding cylinder are three spiders 169, 171 and 172 (Fig. 5) which are spaced axially from each other and secured to the shaft 164 for rotation in unison therewith. As best shown in Fig. 4, the spider 171 has a series of circumferentially spaced radial lugs 173 and the spiders 169 and 172 are similarly equipped with circumferentially spaced radial lugs in axial alignment with lugs 173 on the spider 171. The three spiders 169, 171 and 172 are connected together by a circumferential series of angle bars 174 which extend parallel to the shaft 164 and are secured to axially aligned mounting lugs 173 of the spiders by means of bolts 176 and associated nuts. Each angle bar 174 mounts a series of U-clips 177 which are spaced from each other longitudinally of the bar 174 and present radial, outwardly extending legs. The legs of the U-clips 177 are tapered as best shown in Fig. 4 and form shredding teeth at the periphery of the shredding cylinder 162.

The upper shredding cylinder 163 comprises a shaft 178 which is journaled in bearings 179 and 181 as best shown in Fig. 6, the bearing 179 being mounted in a hole 182 (Fig. 15) of the left side sheet 92, and the bearing 181 being similarly mounted in a hole of the right side sheet 91. Spiders 183, 184 and 186 (Fig. 7) are mounted on the shaft 178 in axially spaced relation to each other and for rotation in unison therewith. The spiders 183, 184 and 186 are connected with each other by three angle bars 187, which are secured to the outer peripheral portions of the spiders 183, 184 and 186 by bolts 188, and are equally distributed circumferentially about the shaft 178. Each of the angle bars 187 mounts a series of U-clips 189 (Fig. 7) the legs of which extend radially outward and are tapered to present shredding teeth of the upper shredding cylinder 163.

Power for driving the slingers 7, 8 and 9, the shredding cylinders 162 and 163, and the slat conveyer 67 is derived from a power take-off shaft on the tractor to which the spreader is hitched in operation, a portion of such power take-off shaft being indicated in Fig. 3 by the reference character 191. A conventional power line assembly 192 comprising universal joints and telescopic shafting is operatively connected with the power take-off shaft 191 and extends rearwardly therefrom in elevated relation to the draft tongue 3. A protective shielding 193 and a support 194 for the power line and shielding are suitably mounted on the tongue 3, as generally indicated in Figs. 1 and 2. Referring to Fig. 8, a sprocket wheel 196 is mounted at the forward side of the spreader coaxially with the shaft 160 of the rotary slinger 9. The sprocket 196 and the shaft 160 are secured for rotation in unison with each other and are connected in driven relation with the power line 192 by means of a universal joint 197 as shown in Figs. 3 and 5. Also mounted at the forward side of the spreader are driving sprockets 198 and 199 (Fig. 8) which are nonrotatably secured to the shafts 144 and 145 of the slingers 7 and 8, respectively, and a pair of idler sprockets 201 and 202 which are mounted on the cross members 136 and 137 as shown in Fig. 8. Another sprocket 203 is mounted at the forward side of the spreader on a rotatable shaft 204 which forms the power input shaft of a bevel gear drive 206, generally indicated in Fig. 2. All of the sprocket wheels 196, 198, 199 and 203, and the idlers 201 and 202 are arranged in a common vertical plane and are connected in power transmitting relation to each other by means of an endless chain 207 as indicated in Fig. 8. The arrows in Figs. 7 and 8 indicate the directions in which the slingers 7, 8 and 9 are rotated upon application of driving power to the sprocket 196 from the power take-off shaft 191 by means of the power line 192. A sheet metal cover 205 (Fig. 2) for the slinger drive is detachably secured along opposite vertical edges to the front flanges of the channel iron posts 84 and 86.

The chain 207 and associated sprockets as shown in Fig. 8 represent power transmitting means which are mounted on the transverse frame structure 83 and operatively connected with the slingers 7, 8 and 9. In addition, these power transmitting means are operatively connected by the bevel gear drive 206 and by another chain 218 and associated sprocket wheels as shown in Fig. 1 with the shredding cylinders 162, 163 so as to rotate the shredding cylinders in the direction of the arrows shown in Fig. 4 and simultaneously operate the slingers in the direction of the arrows shown in Fig. 8.

Referring to Figs. 1 and 2, the bevel gear drive 206 includes an output shaft 208 which extends at right angles to the input shaft 204 and is connected in driven relation with the latter by means of a pair of bevel gears in conventional manner. The output shaft 208 of the bevel gear drive 206 extends outwardly through an aperture 209 (Fig. 15) of the side sheet 92, and a sprocket wheel 211 is secured to the outer end of the shaft 208 for rotation in unison therewith at the left side of the spreader. Also mounted at the left side of the spreader are sprocket wheels 212 and 213 and a sprocket idler 214, the sprockets 212 and 213 being secured to the shafts 178 and 164 of the upper and lower shredding cylinders, respectively, and the idler sprocket 214 being rotatably mounted on the tie beam 68. As shown in Fig. 9, a bracket plate 206 is secured to the outer side of the tie beam 68 and has an elongated aperture 207. The idler sprocket 214 is rotatably supported on a stud which is suitably mounted in the elongated aperture 207 for adjustment selectively to different positions. An endless chain 218 (Fig. 1) is trained about the sprockets 211, 212, 213 and the idler 214 and transmits rotation of the shaft 208 simultaneously to the shredding cylinders 162 and 163. The arrows in Figs. 1 and 4 indicate the direction in which the shredding cylinders 162 and 163 are driven when power is applied from the power take-off shaft 191 to the input sprocket 196 at the front end of the spreader. A sheet metal enclosure 215 (Fig. 2) is mounted at the left side of the forward hood structure to cover the cylinder drive including the chain 218.

Figure 10:
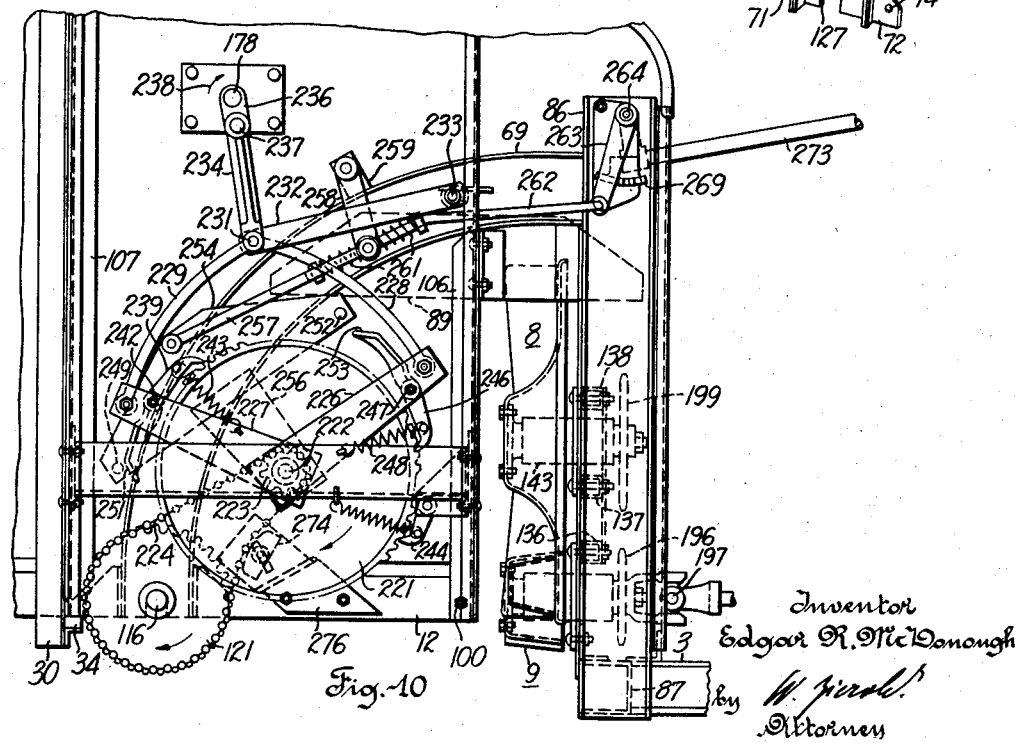
Fig. 10 is a detail view showing a ratchet type drive mechanism at the right side of the machine shown in Figs. 1 and 2.

The slat conveyer 67 of the spreader is driven by means of a ratchet type speed reducing mechanism which is housed in a sheet metal enclosure 219 (Fig. 2) at the right side of the machine and which is shown in detail in Fig. 10. The mechanism shown in Fig. 10 includes a ratchet wheel 221 which is mounted for rotation on a shaft 222. A chain sprocket 223 is mounted coaxially with the ratchet wheel 221 for rotation in unison therewith, and an endless chain 224 connects the sprocket 223 in driving relation with the sprocket wheel 121 on the conveyer drive shaft 116.

An actuating mechanism for the ratchet wheel 221 comprises a pair of rocker arms 226 and 227 which are pivotally mounted on the shaft 222 for up and down swinging movement relative to the ratchet wheel 221 independently of each other. Arcuate links 228 and 229 are pivoted, respectively, to the outer ends of the rocker arms 226 and 227, and both links 228 and 229 are pivotally connected by means of a pin 231 with each other and with the free end of a guide link 232 which is pivotally mounted on the tie beam 69 by means of a pivot pin 233. Also connected to the free end of the guide link 232 by means of the pivot pin 231 is a pitman 234 which is connected at its upper end to a crank 236 by means of a crank pin 237. The crank 236, as best shown in Fig. 6, is nonrotatably secured to the shaft 178 of the upper shredding cylinder. Continuous rotation of the crank 236 in unison with the shaft 178 in the direction of the arrow 238 in Fig. 10 causes up and down swinging movement of the guide link 232 on its pivot 233 and simultaneous up and down swinging movement of the rocker arms 226 and 227 about the shaft 222.

The rocker arm 227 has a pawl 239 which is swingable relative to the arm 227 on a pivot pin 242 and which is biased by a spring 243 to engage the teeth of the ratchet wheel 221. When the rocker arm 227 moves upward from the position in which it is shown in Fig. 10 due to clockwise rotation of the crank 236, the pawl 239 falls into the space between adjacent teeth of the ratchet wheel 221 and causes the latter to turn in clockwise direction as viewed in Fig. 10. The upward swinging movement of the rocker arm 227 during rotation of the crank 236 is followed by a downward movement before the crank has completed a full rotation and during such downward movement of the rocker arm 227 the pawl 239 rides idly over the teeth of the ratchet wheel 221, a locking pawl 244 being provided in conventional manner to prevent anticlockwise movement of the ratchet wheel 221 during the return stroke of the rocker arm 227.

The other rocker arm 226 has a pawl 246 which is swingable on the rocker arm 226 about a pivot pin 247, and a spring 248 biases the pawl 246 to engage the teeth of the ratchet wheel 221. When the crank 236 rotates clockwise from the position in which it is shown in Fig. 10, the rocker arm 226 moves upward and the pawl 246 rides idly over the teeth of the ratchet wheel 221 while, at the same time, a clockwise movement is imparted to the ratchet wheel 221 by the simultaneous upward movement of the rocker arm 227 and pawl 239. When the arm 226 moves downward from its raised position during rotation of the crank 236, the pawl 246 drops into a space between adjacent teeth of the ratchet wheel 221 and imparts a clockwise movement to the latter while the downwardly moving pawl 239 rides idly over the teeth of the ratchet wheel 221. Continuous rotation of the upper cylinder shaft 178 thus results in step by step rotation of the conveyer drive shaft 116 at a greatly reduced rate of speed.

A control mechanism for varying the transmission ratio between the shafts 178 and 116 comprises a stop pin 249 which, as shown in Fig. 10, engages a cam surface 251 of the pawl 239, and another stop pin 252 which is adapted to similarly engage a cam surface 253 of the pawl 246. The stop pins 249 and 252 are mounted on a plate 254, which has a radial arm 256 by means of which the plate 254 is mounted on the shaft 222 for pivotal back and forth adjustment along the circumference of the ratchet wheel 221. An adjusting linkage for the plate 254 comprises a rod 257 which is pivoted at one end on the plate 254 and which is slidably mounted at its other end on a suspension link 258 which is pivotally suspended from a bracket 259 (Fig. 9) on the curved tie beam 69.

Also slidably connected to the suspension link 258 is a reach rod 262 which is in turn pivotally connected with the free end of a rocker arm 263. Springs 261 resiliently secure the rod 262 against longitudinal displacement relative to the suspension link 258. The rocker arm 263, as shown in Fig. 8, is secured on the outer end of a rock shaft 264 which is mounted on the front frame of the spreader for back and forth rotary movement on a horizontal transverse axis. A cross channel 266 is mounted between the posts 84 and 86 of the front frame structure in a fixed position, and a bearing 267 for the inner end of the shaft 264 is mounted on top of the channel 266 as shown in Figs. 4 and 8. The shaft 264 is rotatably and axially slidable in the bearing 267, and another bearing 268 for rotatably and slidably supporting the shaft 264 is mounted on the upper end of the vertical channel post 86. The rocker arm 263 is urged into cooperative engagement with a notched detent segment 269 by means of a coil spring 271 (Fig. 8) which is placed around the shaft 264 and reacts against the bearing 268 and a set collar 272 on the shaft 264 so as to urge the shaft 264 toward the right in Fig. 8. A handle 273 is secured to the inner end of the shaft 264 and extends forwardly from the front frame of the spreader as best shown in Figs. 1 and 2.

In the position of the parts as shown in Fig. 10, the rock shaft 264 is releasably retained in its rotatably adjusted position by cooperative engagement of the arm 263 with a notch of the detent segment 269. Anticlockwise movement of the shaft 264, as viewed in Fig. 10, by upward adjustment of the handle 273 causes the pin supporting plate 254 to move in clockwise direction to a new position of adjustment which places the pin 252 closer to the cam surface 253 of the pawl 246. At the same time the pin 249 moves along the back of the pawl 239 and positively holds the latter out of cooperative engagement with the ratchet wheel 221 during part of the power stroke of the rocker arm 227. In other words, torque transmitting engagement of the pawl 239 with the ratchet wheel 221 will be delayed until the cam surface 251 has cleared the stop pin 249. Similarly, torque transmitting engagement of the pawl 246 with the ratchet wheel 221 will be delayed during the power stroke of the rocker arm 226 until the cam surface 253 has cleared the stop pin 252. The mentioned delay will be longer or shorter depending on the extent to which the rocker arm 263 is adjusted forwardly from the position in which it is shown in Fig. 10.

When the handle 273 is adjusted to its lowest position as shown in Fig. 10, the slat conveyor 67 will be operated at maximum speed because the full power stroke of the rocker arm 227 and the full power stroke of the rocker arm 226 will be effective to rotate the ratchet wheel 221. On the other hand, when the rocker arm 263 is moved forwardly into engagement with the next notch of the detent segment 269, the operating speed of the slat conveyor will be reduced because only part of the power stroke of the rocker arm 227 and of the power stroke of the rocker arm 226 will be effective to rotate the ratchet wheel 221. The control mechanism is preferably designed in such a manner that adjustment of the rocker arm 263 to its extreme forward position, as viewed in Fig. 10, will be effective to interrupt transmission of power from the shaft 178 of the upper shredding cylinder to the ratchet wheel 221 and therefore to the driving shaft 116 of the slat conveyor. In order to adjust the tension of the drive chain 224 a block 274 is adjustably mounted on a bracket 276 secured to the side beam 12, the block 274 serving the same function as an idler, and bearing against the slack run of the chain.

In order to adjust the tension of the slat conveyor 67, the rear idler shaft 117 (Fig. 1) is arranged for selective adjustment in a horizontal direction by means of a retainer plate 277 at the outer side of the side beam 11 and by means of a similar retainer plate, not shown, at the outer side of the side beam 12. As shown in Fig.

16, the rear idler shaft 117 extends outwardly through a horizontally elongated slot 278 in the vertical flange of the side beam 11, and a guide pin 279 slidably extends through diametrically aligned holes of the shaft 117 and is rigidly mounted at its rear end on a vertical angle bracket 281. An idler sprocket 282 for the chain 70 (Fig. 1) of the slat conveyor is rotatably mounted on the shaft 117 in an axially fixed position. The retainer plate 277 is secured in position by means of two bolts 283 which extend through holes in the vertical flange of the side beam 11 and through registering holes in the retainer plate 277. Supplemental holes 284 are provided in the retainer plate 277 for selective mounting of the retainer plate 277 in rearwardly adjusted positions.

Figure 16:
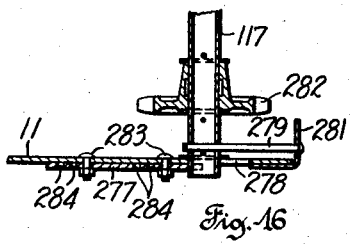
Fig. 16 is an enlarged partial section on line XVI—XVI of Fig. 1.
Figure 17:
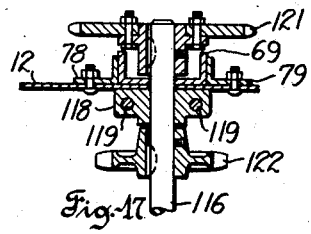
Fig. 17 is a partial section, at a somewhat reduced scale, on line XVII—XVII of Fig. 4.

The arrangement of parts at the left side of the spreader, as shown in Fig. 16, is duplicated at the right side of the spreader so that both ends of the shaft 117 may be adjusted rearwardly for the purpose of tightening the slat conveyor 67.

In operation, the upper run of the slat conveyer 67 moves forwardly over the bottom 51 of the wagon box and manure contained in the box will therefore be advanced into the forward housing part of the spreader. The lower and upper shredding cylinders are revolving at fairly high speeds in the direction of the arrows shown in Fig. 4, a suitable speed for the upper cylinder, for instance, being 340 r.p.m. and for the lower cylinder 370 r.p.m. The faster speed of the lower cylinder is obtained by a somewhat smaller number of teeth on the sprocket wheel 213 than on the sprocket wheel 212. Also, the effective diameter and the number of shredding teeth presented by the lower cylinder are larger than the effective diameter and the number of shredding teeth presented by the upper cylinder. As a result, the lower cylinder will shred a major portion of the manure which is fed to it by the advancing upper run of the slat conveyer. The upper cylinder 163 whose lower shredding teeth move opposite to the upper shredding teeth of the lower cylinder enhances the shredding action of the lower cylinder, and a substantial volume of finely shredded manure will be delivered to the slingers 7 and 8 from the upper and forward parts of the lower shredding cylinder 162. The receptacle or wagon box will normally be loaded to full capacity and the upper part of the forwardly moving load will be engaged by the teeth 189 of the upper shredding cylinder. The manure torn loose by the upper shredding cylinder moves forwardly through the space between the top wall 109 and the upper shredding cylinder and then downwardly along the oblique cross wall 112 toward the peripheries of the slingers 7 and 8. The shredded manure which is delivered to the slingers by the rotating cylinders 162 and 163 is engaged by the blades 148 and 154 (Fig. 7) of the fast rotating slingers 7, 8 and, as a result, the shredded manure will be thrown outwardly in opposite directions from the spreader and also downwardly under the spreader. The downward discharge of manure from the spreader is assisted by the slinger 9 which also rotates at high speed.

It will be noted that a continuous unobstructed gap for the ejection of material from the bottom and both sides of the receptacle by the slingers 7, 8, 9 is afforded by the rearward spacing of the side beams 11, 12 and of the receptacle bottom wall 51 from the transverse front frame structure 83, and by the rearward spacing of the vertical angle iron posts 97 (Fig. 1) and 106 (Fig. 4) from the channel iron posts 84 and 86, respectively, of the front frame structure 83. A horizontal part of the continuous manure discharge gap is formed by a bottom opening in rear of the transverse frame structure 83 and in front of the transverse front edge of the floor 51 of the wagon box. At the left side of the spreader the continuous manure discharge gap includes a vertical recess which is defined by the rear edge of the channel post 84 of the front frame structure, the lower edge of the reinforcing plate 88 and the front angle iron 97 of the left side sheet 92. At the right side of the spreader the continuous manure discharge gap includes a vertical recess which is defined by the rear edge of the vertical post 86 on the front frame structure, the lower edge of the reinforcing plate 89 and the vertical angle iron 106 (Fig. 4) of the right side sheet 91.

The slat conveyor 67 and the shredding cylinders 162 and 163 are operative to feed manure to the slingers 7, 8 and 9 in finely divided form without excessive consumption of power, and the slingers are effective to deposit a uniform layer of finely divided manure on the ground. The discharge of manure from the spreader is not disturbed by any frame members obstructing the discharge gap in rear of the transverse front frame structure 83. The arcuate tie beams 68 and 69 lend sufficient strength to the machine so that it will stand up under the severe operating conditions and rough usage to which it is normally subjected.

It should be understood that it is not intended to limit the invention to the particular forms and details described hereinabove, and that the invention includes such other forms and modifications as are embraced by the scope of the appended claims.

What is claimed is:

1. A manure spreader comprising, in combination, a receptacle, a pair of vertically spaced shredding cylinders rotatably mounted at one end of said receptacle in opposite side members of the latter, a pair of transversely spaced rotary slingers mounted on and in parallel relation to a transverse, vertical wall structure of said receptacle at said one end of the latter and opposite to the lower of said shredding cylinders; a bottom wall between said receptacle side members spaced from said transverse wall structure so as to provide a bottom opening in underlying relation to said slingers; said transverse wall structure having an upper portion rigidly connected with upper portions, respectively, of said side members, and lower portions of said side members being separated by vertical recesses at opposite sides, respectively, of said receptacle from a lower portion of said transverse wall structure so that a continuous, unobstructed gap for the ejection of material from the bottom and both sides of said receptacle by said slingers will be afforded by said bottom opening and recesses; conveying means operatively mounted within said receptacle for advancing material toward said one end of the latter; and drive means associated with said receptacle and operable to rotate both of said cylinders in the same direction so that material fed thereto by said conveying means will be delivered over the top of each of said cylinders toward said transverse wall structure.

2. A semitrailer type manure spreader comprising, in combination, a wheeled bed frame including a pair of transversely spaced horizontal side beams; a pair of transversely spaced tie beams connected in upwardly and forwardly projecting relation to said side beams, respectively; each of said side beams having a forward end portion extending forwardly beyond the rear end of its associated tie beam; a transverse frame structure rigidly connected with and depending from the forward ends of said tie beams in forwardly spaced relation to the forward ends of said side beams so as to leave an unobstructed manure discharge space at the bottom and opposite sides of said transverse frame structure in rear of the latter and forwardly of said bed frame; a hitch structure secured to said transverse frame structure independently of said bed frame and in nonobstructing relation to said manure discharge space; wall means including side sheets secured to said tie beams and to said forward end portions of said side beams to provide a latterly closed space in rear of said manure discharge space; shredding cylinder means operatively mounted within said laterally closed space in rear of said transverse frame structure and adapted upon rotation in a predetermined direction to feed manure toward said transverse frame structure; manure ejecting means operatively mounted on said transverse frame structure in material receiving relation to said shredding cylinder means and in material delivering relation to said manure discharge space; and power transmitting means mounted on said transverse frame structure and operatively connected with said shredding cylinder and ejecting means so as to rotate said shredding cylinder means in said predetermined direction and simultaneously operate said ejecting means.

3. A semitrailer type manure spreader as set forth in claim 2 wherein said shredding cylinder means comprise a pair of upper and lower shredding cylinders rotatably mounted at their opposite ends, respectively, on said side sheets.

4. A semitrailer type manure spreader as set forth in claim 3 and wherein said manure ejecting means comprise a pair of rotary slingers mounted on said transverse frame structure in material receiving relation to said shredding cylinders and in material delivering relation to said manure discharge space.

5. In a semitrailer type manure spreader, the combination of a wheeled bed frame including a pair of transversely spaced horizontal side beams; a pair of transversely spaced tie beams connected in upwardly and forwardly projecting relation to said side beams, respectively; a transverse frame structure rigidly connected with and depending from the forward ends of said tie beams in forwardly spaced relation to the forward end of said bed frame so as to leave an unobstructed manure discharge space at the bottom and opposite sides of said transverse frame structure in rear of the latter and forwardly of said bed frame; and a hitch structure secured to said transverse frame structure independently of said bed frame and in nonobstructing relation to said manure discharge space.

6. A semitrailer type manure spreader comprising, in combination, a wheeled bed frame including a pair of transversely spaced horizontal side beams; a pair of transversely spaced tie beams connected in upwardly and forwardly projecting relation to said side beams, respectively; each of said side beams having a forward end portion extending forwardly beyond the rear end of its associated tie beam; a transverse frame structure rigidly connected with and depending from the forward ends of said tie beams in forwardly spaced relation to the forward ends of said side beams so as to leave an unobstructed manure discharge space at the bottom and opposite sides of said transverse frame structure in rear of the latter and forwardly of said bed frame; a hitch structure secured to said transverse frame structure independently of said bed frame and in nonobstructing relation to said manure discharge space; and wall means including side sheets secured to said tie beams and to said forward end portions of said side beams to provide a latterly closed space in rear of said manure discharge space.

References Cited in the file of this patent

UNITED STATES PATENTS

| | | |
|---|---|---|
| 1,462,996 | Allen et al. | July 24, 1923 |
| 1,552,585 | Synck | Sept. 8, 1925 |
| 2,296,474 | Kucera | Sept. 22, 1942 |
| 2,343,303 | Kuhlman | Mar. 7, 1944 |
| 2,660,439 | Scranton | Nov. 24, 1953 |
| 2,704,670 | Vutz et al. | Mar. 22, 1955 |